United States Patent [19]
Bryg et al.

[11] Patent Number: 5,586,297
[45] Date of Patent: Dec. 17, 1996

[54] PARTIAL CACHE LINE WRITE TRANSACTIONS IN A COMPUTING SYSTEM WITH A WRITE BACK CACHE

[75] Inventors: William R. Bryg, Saratoga; Robert Brooks, Roseville; Eric W. Hamilton, Mountain View, all of Calif.; Michael L. Ziegler, Whitinsville, Mass.

[73] Assignee: Hewlett-Packard Company, Palo Alto, Calif.

[21] Appl. No.: 217,588

[22] Filed: Mar. 24, 1994

[51] Int. Cl.⁶ ............................. Q06F 12/12; Q06F 12/04
[52] U.S. Cl. .................. 395/470; 395/460; 395/473; 395/468; 395/185.1; 395/849; 395/290; 364/DIG. 1
[58] Field of Search .................................... 395/460, 470, 395/473, 468, 185.1, 849, 650, 290; 364/228, DIG. 1

[56] References Cited

U.S. PATENT DOCUMENTS

| | | | |
|---|---|---|---|
| 4,816,997 | 3/1989 | Scales, III et al. | 395/290 |
| 5,032,985 | 7/1991 | Curran et al. | 395/650 |
| 5,119,485 | 6/1992 | Ledbetter, Jr. et al. | 395/473 |
| 5,131,083 | 7/1992 | Crawford et al. | 395/849 |
| 5,146,603 | 9/1992 | Frost et al. | 395/470 |
| 5,191,649 | 3/1993 | Cadambi et al. | 364/228 |
| 5,197,144 | 3/1993 | Edenfield et al. | 395/470 |
| 5,226,150 | 7/1993 | Callander et al. | 395/185.1 |
| 5,301,298 | 4/1994 | Kagan et al. | 395/468 |

FOREIGN PATENT DOCUMENTS

| | | |
|---|---|---|
| 261029 | 3/1988 | European Pat. Off. . |
| 579418 | 1/1994 | European Pat. Off. . |
| 4123550 | 1/1992 | Germany . |

OTHER PUBLICATIONS

David A. Patterson, John L. Hennessy, *Computer Architecture A Quantitative Approach*, Morgan Kauffman Publishers, Inc., San Mateo, California, 1990, pp. 466–474.

Series 10000 Technical Reference Library vol. 6—Core System Buses and Controllers, Order No. 011725–A00, Apollo Computer, Inc. Chelmsford, MA, 2–1 through 2–16, 3–22 through 3–28.

IBM Technical Disclosure Bulletin, "Micro Channel Data Streaming & Input/Output Snooping Facility For Personal Computer Systems", vol. 36, Oct. 10, 1993, pp. 187–191.

*Primary Examiner*—Reba I. Elmore
*Assistant Examiner*—J. Peikari

[57] ABSTRACT

A computing system is presented which includes a memory, an input/output adapter and a processor. The processor includes a write back cache in which dirty data may be stored. When performing a coherent write from the input/output adapter to the memory, a block of data is written from the input/output adapter to a memory location within the memory. The block of data contains less data than a full cache line in the write back cache. The write back cache is searched to determine whether the write back cache contains data for the memory location. When the search determines that the write back cache contains data for the memory location a full cache line which contains the data for the memory location is purged.

12 Claims, 5 Drawing Sheets

PARTIAL CACHE LINE WRITE TRANSACTIONS IN A COMPUTING SYSTEM WITH A WRITE BACK CACHE

BACKGROUND

The present invention concerns input/output (I/O) adapters and particularly the performance by I/O adapters of coherent direct memory access (DMA) write transactions for a block of data which is smaller than a cache line.

Most modern computer systems include a central processing unit (CPU) and a main memory. The speed at which the CPU can decode and execute instructions and operands depends upon the rate at which the instructions and operands can be transferred from main memory to the CPU. In an attempt to reduce the time required for the CPU to obtain instructions and operands from main memory many computer systems include a cache memory between the CPU and main memory.

A cache memory is a small, high-speed buffer memory which is used to hold temporarily those portions of the contents of main memory which it is believed will be used in the near future by the CPU. The main purpose of a cache memory is to shorten the time necessary to perform memory accesses, either for data or instruction fetch. The information located in cache memory may be accessed in much less time than information located in main memory. Thus, a CPU with a cache memory needs to spend far less time waiting for instructions and operands to be fetched and/or stored.

A cache memory is made up of many blocks of one or more words of data. Each block has associated with it an address tag that uniquely identifies which block of main memory it is a copy of. Each time the processor makes a memory reference, an address tag comparison is made to see if a copy of the requested data resides in the cache memory. If the desired memory block is not in the cache memory, the block is retrieved from the main memory, stored in the cache memory and supplied to the processor.

In addition to using a cache memory to retrieve data from main memory, the CPU may also write data into the cache memory instead of directly to the main memory. When the processor desires to write data to the memory, the cache memory makes an address tag comparison to see if the data block into which data is to be written resides in the cache memory. If the data block exists in the cache memory, the data is written into the data block in the cache memory. In many systems a data "dirty bit" for the data block is then set. The dirty bit indicates that data in the data block is dirty (i.e., has been modified), and thus before the data block is deleted from the cache memory the modified data must be written into main memory. If the data block into which data is to be written does not exist in the cache memory, the data block must be fetched into the cache memory or the data written directly into the main memory.

Input/output (I/O) adapters which interact with memory need to be designed to integrate with all features of the computing system. To this end, address translation maps within the I/O adapters are often used to convert I/O bus addresses to memory addresses. Such address translation maps have been used when the I/O bus address range is smaller than the memory address range, so that I/O accesses can reference any part of memory.

In typical usage, I/O address translation maps have been managed by software. Each entry in the address translation map is explicitly allocated and loaded by operating system software. When an I/O adapter accesses the main memory in a system where one or more processors utilizes a cache, it is necessary to take steps to insure the integrity of data accessed in memory. For example, when the I/O adapter accesses (writes or reads) data from memory, it is important to determine whether an updated version of the data resides in the cache of a processor on the system. If an updated version of the data exists, something must be done to insure that the I/O adapter accesses the updated version of the data. An operation that assures that the updated version of the data is utilized in a memory references is referred to herein as a coherence operation.

Various schemes have been suggested to insure coherence of data accessed by an I/O adapter from the system memory. For example, one solution is for software to explicitly flush the cache for each processor on the system before the I/O adapter accesses those locations in memory. Flushing the cache will assure that any updated version of the data will be returned to the main memory before the data is accessed by the I/O adapter. However, this scheme can significantly increase the overhead of a memory access by the I/O adapter.

In another scheme, the processor's cache is designed so that it can respond to other processors' memory transactions, checking whether the requested data is present in the first processor's cache. Data is supplied or invalidated as appropriate for the transaction. The transaction used for DMA input is typically known as "Write New Block", "Write Purge", or "Write Invalidate". In a "Write Purge" transaction, the I/O adapter supplies an address and a block of data to be written into memory. Each processor cache checks whether the specified address is in its cache, and marks the line invalid if the line is present. In prior-art systems where caches may contain dirty or modified data, the amount of data written is required to exactly match the size of a cache line in each system processor data cache, to avoid inadvertently destroying dirty data that may be in the unwritten portion of the cache line.

One way to avoid the problem of destroying dirty data is to use a "write through" cache. In a write through cache, when a processor writes new data into its cache, the processor also writes the data through to the memory. Therefore a write through cache never contains data that is dirty. In a "write back" cache, when a processor writes new data into its cache, the processor does not write the data through to the memory. Generally, this dirty data may not be overwritten without being returned to memory. However, write through caches have generally recognized disadvantages, including requiring more bus bandwidth for a typical operation than do write back caches.

In a "write back" cache, requiring the amount of data written to exactly match the size of a cache line in each system processor data cache works well if the processor's cache is physically addressed and physically tagged. This is because the DMA transfers are typically performed using physical addresses. If the processors' caches are implemented such that they are virtually indexed, however, the problem of cache-coherent I/O becomes more difficult.

Some systems with virtually indexed processor caches have used the first solution above, of requiring software to explicitly flush the cache for each processor on the system.

On other systems with virtually indexed processor caches, each system processor includes a "Reverse Translation Table" or "Reverse TLB" which translates physical addresses to virtual addresses for handling coherence operations. When the I/O adapter accesses the system memory, each system processor translates the real address to a virtual address and accesses its cache to determine whether the accessed data is in the cache. If so, the accessed data is flushed to memory before the I/O adapter completes the access. Alternately, the I/O adapter can access the data directly from the cache.

In another scheme, when the I/O adapter accesses memory, the I/O adapter forwards to each processor a coherence index. The coherence index is used by each processor to access the cache associated with the processor to determine whether the accessed data is in the cache. If so, the accessed data is flushed to memory before the I/O adapter completes the access. Alternately, the I/O adapter can access the data directly from the cache.

In general, in prior art cache-coherent I/O schemes, an I/O adapter has performed DMA transfers using a data block-size that matches the size of a cache line in each system processor data cache. This simplifies cache coherent DMA writes from the I/O adapter to memory. Particularly, when performing a cache coherent DMA write from an I/O adapter to memory using a data block-size that matches the size of a cache line in each system processor data cache, a coherence index may be used by each system processor to invalidate a full cache line.

However, when performing a cache coherent DMA write from an I/O adapter to memory using a data block-size that is less than the size of a cache line in each system processor data cache, it may be impossible to invalidate a full cache line because the part of the cache line that is not addressed by the data block may be dirty. In such a case, in order to perform a coherent write of a partial cache line, the I/O adapter has generally had to perform a coherent read to obtain the full cache line. The I/O adapter modifies the full cache line to include the new data. The I/O adapter then writes the modified full cache line back to the memory. While this allows the correct operation of a cache coherent DMA write from an I/O adapter to memory using a data block-size that is less than the size of a cache line in each system processor data cache, the complexity of the operation reduces throughput of DMA transfers.

The I/O adapter often cannot arbitrarily "choose" what data block size to use for a DMA transaction, but rather must use the same data block size that was specified by the I/O device in the transaction that was issued on the I/O bus. However, in the case of coherent DMA write operations where the I/O device block size is smaller than the processor cache's line size, the I/O adapter in prior art systems has had to perform the complex coherent read, modify write-back described above.

SUMMARY OF THE INVENTION

In accordance with the preferred embodiment of the present invention, a method is presented which allows for a coherent write operation to be performed for a block of data which is less than a full cache line. A computing system includes a memory, an input/output adapter and a processor. The processor includes a cache. When performing a coherent write from the input/output adapter to the memory, a block of data is written from the input/output adapter to a memory location within the memory. The block of data contains less data than a full cache line in the cache. For example, a message is sent over a bus connecting the memory, the input/output adapter and the processor. The message includes an address of the memory location and a coherency index for the memory location.

The cache is searched to determine whether the cache contains data for the memory location. For example, the coherency index is used in the search, if needed. When the search determines that the cache contains data for the memory location, a full cache line which contains the data for the memory location is purged.

The above-described "fast" DMA method works well when DMA transactions are aligned on cache line boundaries. The DMA will eventually write the entire cache line using several coherent sub-line writes. Each coherent sub-line write will also perform a purge of the cache line in the processor caches. The second and later purges of the same cache line are usually redundant, but are needed for the case where a processor refetches the line into its cache after the first coherent sub-line write.

However, in the case where DMA transactions are not aligned on cache line boundaries, the use of "fast" DMA may result in "dirty" memory locations being purged from the cache. The I/O adapter must somehow be "informed" when it is allowed to do "fast" DMA or software must guarantee that the I/O adapter is always allowed to do "fast" DMA. In the preferred implementation, a DMA type indicator may be placed in a translation map entry along with an address of a data page in the memory. In this case, when transferring a block of data that is less than a full cache line in the cache, the value of the DMA type indicator for the data page in the memory which contains the memory location is checked. When the value of the DMA type indicates "fast" DMA may be performed, a coherent write, as described above, is performed. When the value of the DMA type indicates "fast" DMA may not be performed, a "safe" DMA transaction is performed. In a "safe" DMA transaction, a coherent read is performed to obtain the current copy of the cache line from the memory, or from a cache which contains the memory location. The cache line is modified to include the block of data. Then, the modified cache line is written back to the memory.

The preferred embodiment of the present invention allows for the implementation of a fast DMA transaction for data blocks which are smaller in size than a full cache line.

DESCRIPTION OF THE PREFERRED EMBODIMENT

Figure 1:
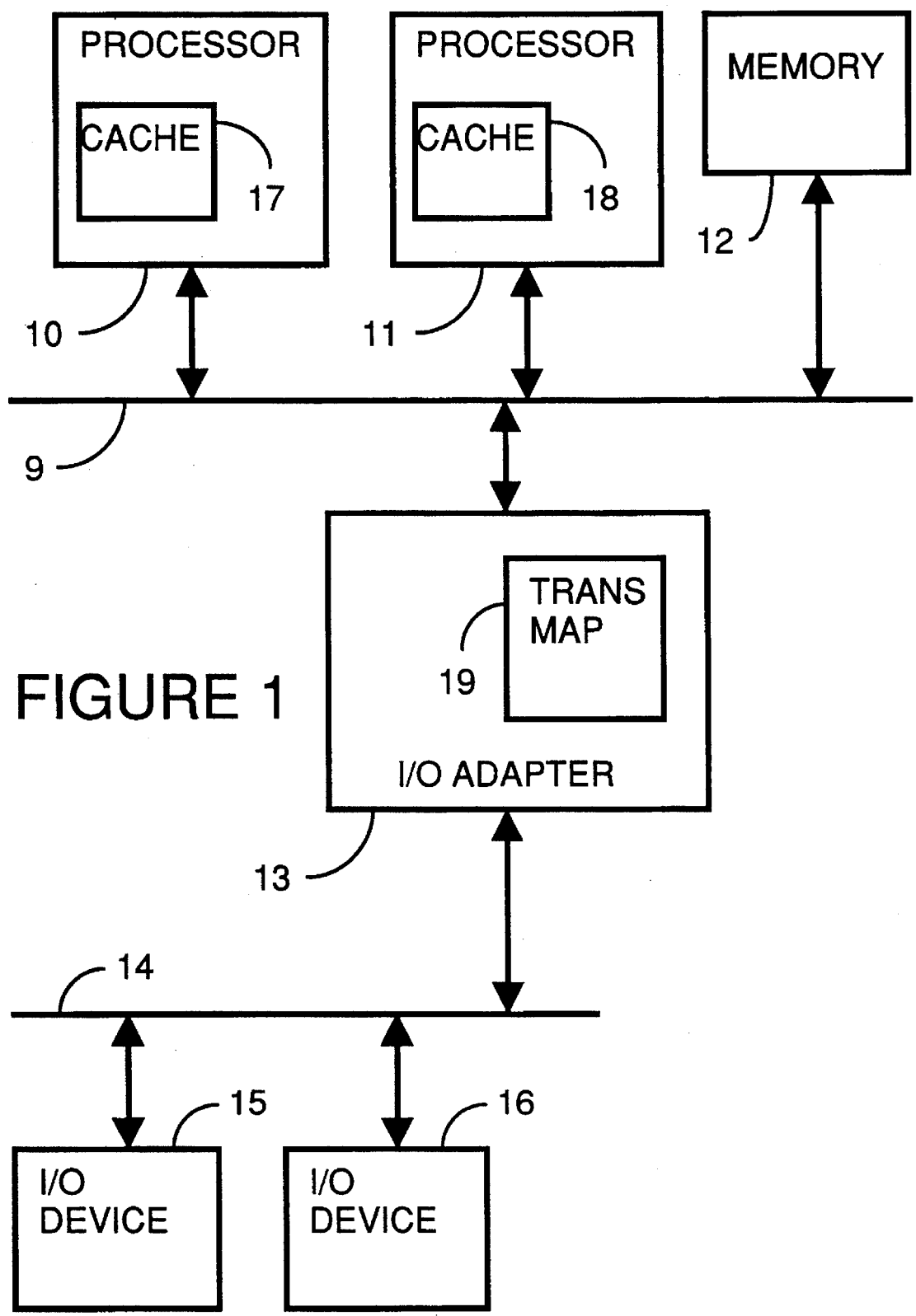
FIG. 1 shows a simplified block diagram of a computer system with an input/output (I/O) adapter in accordance with the preferred embodiment of the present invention.

FIG. 1 shows a simplified block diagram of a computer system. A processor 10, a processor 11 and a memory 12 are shown connected to a memory bus 9. Processor 10 utilizes a data cache 17. Processor 11 utilizes a data cache 18. Also connected to memory bus 9 is an input/output (I/O) adapter 13. I/O adapter 13 is connected to an I/O bus 14. Also connected to I/O bus 14 are an I/O device 15 and an I/O device 16. A translation map 19 is used to convert addresses used for I/O bus 14 to addresses used by memory 12.

Figure 2:
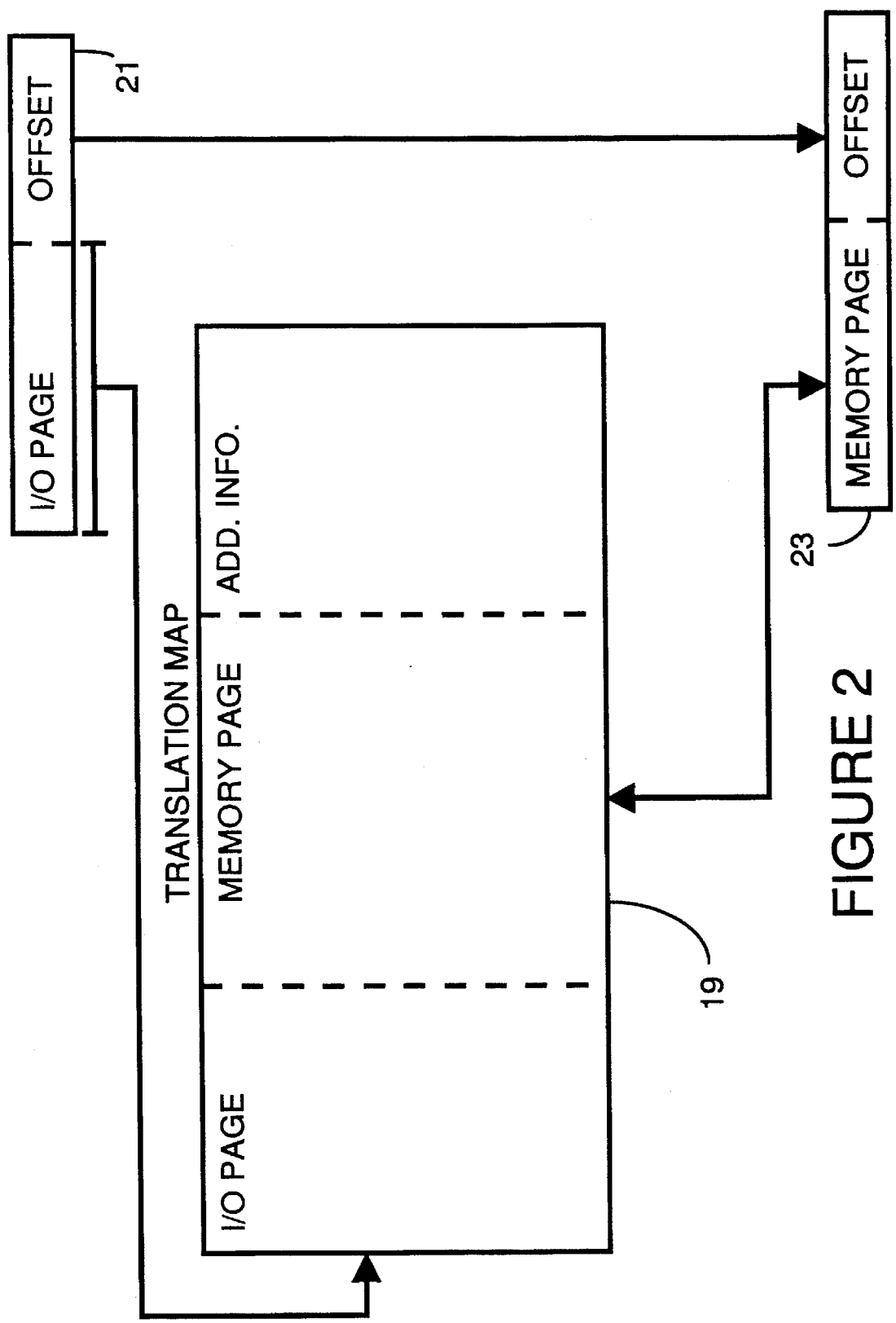
FIG. 2 shows an implementation of a translation map within the I/O adapter shown FIG. 1, in accordance with the preferred embodiment of the present invention.

FIG. 2 shows implementation of translation map 19 in accordance with the preferred embodiment of the present invention. Translation map 19 is used to translate an I/O bus address 21 to a memory address 23. Alternately, translation map 19 could be implemented as a direct mapped cache of I/O translations, a fully associative cache or a set associative cache.

In the preferred embodiment, during a translation, an I/O page is used to access a corresponding memory page within translation map 19. In the embodiment shown in FIG. 2, the I/O page number is used as an index into translation map 19. The I/O address offset is the same as the memory address offset. For example, in the preferred embodiment, I/O bus 14 utilizes thirty-two bit addresses, each address having a twenty bit I/O page number and a twelve bit offset. Memory bus 9 utilizes forty bit addresses, each address having a twenty-eight bit memory page number and a twelve bit offset.

In the preferred embodiment, for each memory page, translation map 19 also includes a coherence index. The coherence index is a portion derived from a virtual address and used to index cache 17 within processor 10 and cache 18 within processor 11. When the coherence index is passed as part of a memory access transaction, it allows processors 10 and 11 to easily look up information in cache 17 and 18, respectively, for potential coherency conflicts. Operating system software running on processor 10 or processor 11, loads address translation information into translation map 19 within I/O adapter 13. This information includes the coherence index and other fields as described below.

Figure 3:
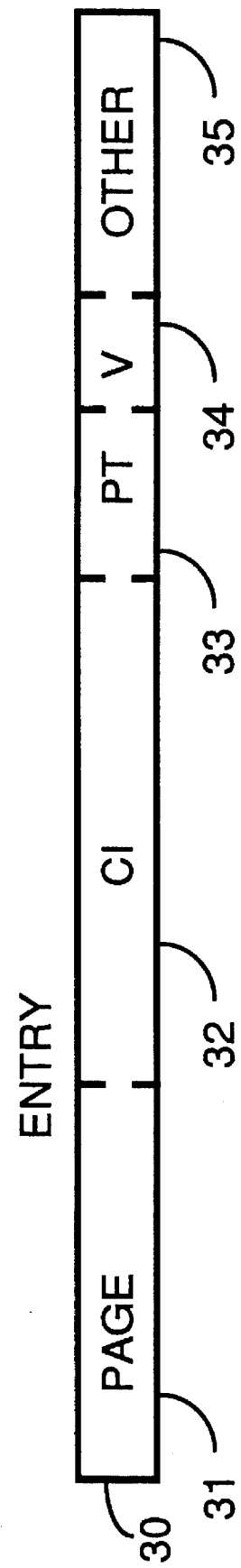
FIG. 3 shows the format of an entry in the translation map shown in FIG. 2, in accordance with the preferred embodiment of the present invention.

FIG. 3 shows the format of an entry 30 in translation map 19 in accordance with the preferred embodiment of the present invention. A page field 31 of entry 30 contains the twenty-eight bit physical page number of an address in memory 12. A coherence index (CI) field 32 of entry 30 contains a ten bit coherency index of the physical page number of an address in memory 12. A page type (PT) field 33 contains two bits of page type. A valid indicator (V) field 34 contains a one bit valid indicator. Additional fields 35 may be added depending on the particular implementation.

A first bit in page type (PT) field 33 indicates whether locking is enabled. When locking is enabled, I/O devices connected to I/O bus 14, such as I/O device 15 and I/O device 16, can lock main memory 12 for several transactions, to perform an atomic sequence. Locking is sometimes required when I/O bus 14, or another I/O bus connected to I/O bus 14, requires locking during memory transactions. However, locking memory degrades system performance, so locking is enabled only on those pages that require the capability. Operating system software running on processor 10 or processor 11, when loading address translation information into translation map 19 within I/O adapter 13, places a value in page type field 33 which indicates whether locking for the corresponding page is enabled.

A second bit in page type (PT) field 33 indicates what type of direct memory access (DMA) transactions are to be used. For a first value of the second bit in page type field 33, the DMA type is "fast". For fast DMA type, I/O adapter 13 assumes that data for I/O access of the page is aligned on cache line boundaries, including the case where software "pads" the ends of each buffer to the next cache line boundary. For a second value of the second bit in page type field 33, the DMA type is "safe". For safe DMA type, I/O adapter 13 does not assume that data for I/O access of the page is aligned on cache line boundaries.

In the preferred embodiment, cache line size for cache 17 and cache 18 is thirty-two bytes. For both fast DMA type and safe DMA type, write transactions containing a full cache line of data (thirty-two bytes), and aligned on a cache line boundary, are performed as in the prior art. For both cases, I/O adapter 13 will issue a WRITE_PURGE transaction which writes thirty-two bytes of data to a thirty-two byte aligned address in memory. The WRITE_PURGE transaction includes a coherency index which is utilized by processor 10 and processor 11 to search for a corresponding entry in cache 17 and cache 18, respectively. If the entry is found in cache 17 or cache 18, the cache line is purged.

Figure 4:
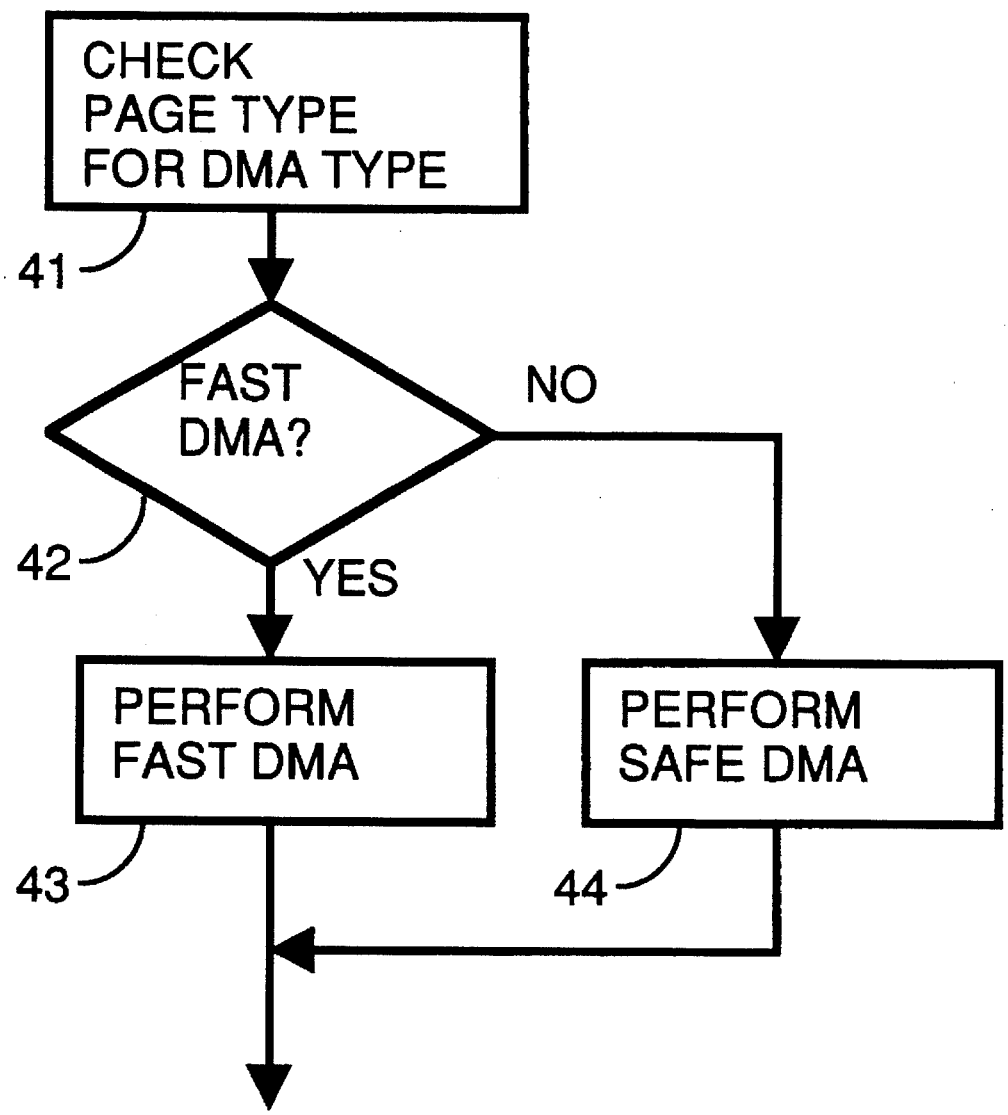
FIG. 4 is a flowchart which demonstrates how a DMA type indicator in the translation map affects performance an I/O adapter during a data transaction in accordance with a preferred embodiment of the present invention.

FIG. 4 demonstrates how the second bit in page type field 33 affects performance of I/O adapter 13 on a data transaction smaller than thirty-two bytes in size (i.e., a sub-line data transaction). When I/O adapter 13 performs a sub-line write data transaction, I/O adapter 13, in a step 41 and a step 42, checks page type field 33 to determine whether the second bit of page type field 33 is cleared to logic zero, indicating fast DMA is to be performed. If fast DMA is indicated, in a step 43, a fast DMA transaction is performed. If safe DMA is indicated, in a step 44, a safe DMA transaction is performed.

In order to perform a safe DMA coherent write from I/O adapter 13 to memory 12, I/O adapter 13 performs a coherent read (private) to obtain the full cache line from memory 12, cache 17 and cache 18. The full cache line is modified to include the new data. I/O adapter 13 then performs a non-coherent write from I/O adapter 13 to memory 12 of the modified full cache line.

When performing a fast DMA coherent write from I/O adapter 13 to memory 12, I/O adapter 13 uses a WRITE16_PURGE transaction which writes an aligned sixteen byte block to memory 12. The WRITE 16_PURGE includes a coherency index which is utilized by processor 10 and processor 11 to search for a corresponding entry in cache 17 and cache 18, respectively. If the entry is found in cache 17 or cache 18, the complete cache line is purged.

Figure 5:
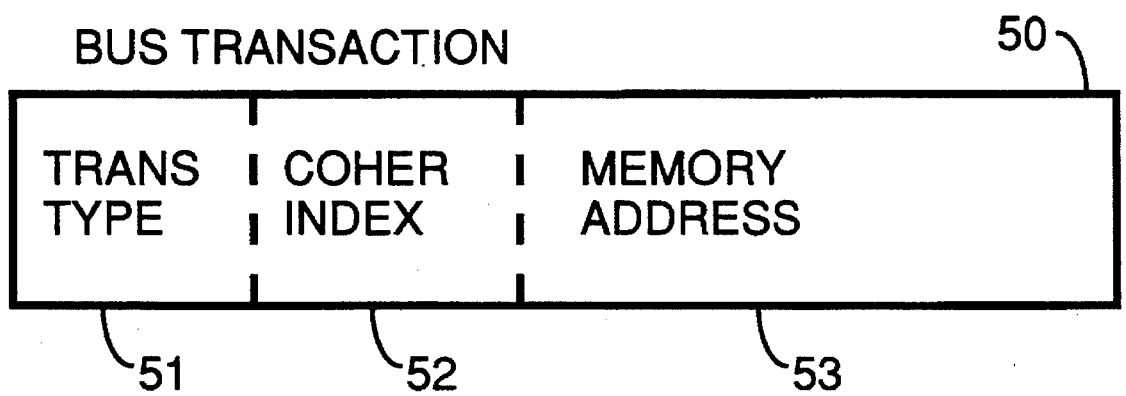
FIG. 5 shows the format of a bus transaction in accordance with a preferred embodiment of the present invention.

FIG. 5 shows the format of a bus transaction 50 for a WRITE16_PURGE transaction in accordance with the preferred embodiment of the present invention. An eight bit transaction type field 51 contains a value which indicates a WRITE16_PURGE transaction. In the preferred embodiment, this is the hexadecimal number 0XBE. A twelve bit coherence index field 52 contains a coherence index for the transaction. The ten bit coherence index field 32 is padded with two zeros to make the twelve bit coherence index field 52 because the preferred implementation of the present invention uses only ten bits.

Memory address field 53 contains the most significant thirty-six bits of a forty-bit address in memory 12 which indicates the destination of the write data. The four least significant bits of the address are not specified and are assumed to be zero because the transaction is aligned to a sixteen byte boundary. After I/O adapter places bus transaction 50 on memory bus 9, I/O adapter then transfers sixteen bytes of data over memory bus 9. Memory 12 will store these data bytes beginning at the address specified in memory address field 53. Processor 10 will check cache 17 using the coherence index in coherence index field 52 to determine whether cache 17 contains an entry for the address specified in memory address field 53. If so, processor 10 will purge the entire cache line. Likewise, processor 11 will check cache 18 using the coherence index in coherence index field 52 to determine whether cache 18 contains an entry for the address specified in memory address field 53. If so, processor 11 will purge the entire cache line.

Since the WRITE16_PURGE transaction has the capability of destroying dirty data in systems having cache lines greater than sixteen bytes (e.g. in systems having thirty-two byte cache lines or sixty-four byte cache lines), a WRITE16_PURGE transaction should be used only if it does not matter if processor data in the same cache line is destroyed or if both the entire line will be written by the DMA (i.e., it is a fast DMA) and software running on processors 10 and 11 will not be modifying the data written by the DMA.

During a fast DMA transaction, data for I/O access of the page is aligned on cache line boundaries. This includes the case where software "pads" the ends of each buffer to the next cache line boundary. In the preferred embodiment, the expected case for a fast DMA transaction is that two WRITE16_PURGE transactions will be issued in succession in order to write the equivalent of a cache line into memory 12. In the first WRITE16_PURGE transaction, I/O adapter will write the first half of a cache line to memory 12. Processor 10 and processor 11 will purge any stale copy of the full cache line from cache 17 and cache 18, respectively. In the second WRITE16_PURGE transaction, I/O adapter will write the second half of a cache line to memory 12. The second WRITE 16_PURGE transaction may occasionally result in processor 10 or processor 11 purging a copy of the full cache line from cache 17 or cache 18, respectively. For example, this can occur when automatic processor prefetching hardware happened to bring back into a cache the cache line purged as a result of the first WRITE16_PURGE transaction. After the completion of the second WRITE16_PURGE transaction, there will be no stale copies of the line in cache 17 or cache 18. A stale copy of data is data for which a more up-to-date version exists somewhere else.

The present invention takes advantage of the fact that most DMA transactions involve full pages, and are page-aligned. Thus the vast majority of DMA transactions are aligned on cache line boundaries and may be performed as "fast" DMA transactions. In the preferred embodiment, the use of an indicator in page type field 33 allows safe DMA to be designated for the case where DMA transactions are not aligned on cache line boundaries. Alternately, this indicator can be eliminated and WRITE16_PURGE transactions can be used for all DMA input of the appropriate block size. However, in this case, it should be a system requirement that all DMA transactions are aligned on cache line boundaries.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. In a computing system which includes a memory, an input/output adapter and a processor, the processor including a write back cache in which dirty data may be stored, a method comprising the steps of:

(a) writing a block of data from the input/output adapter to a memory location within the memory, the block of data containing less data than a full cache line in the write back cache;

(b) searching the write back cache to determine whether the write back cache contains data for the memory location written to in step (a); and, (c) when the search in step (b) determines that the write back cache contains data for the memory location written to in step (a), purging a full cache line which contains the data for the memory location written to in step (a).

2. A method as in claim 1, wherein step (a) includes the substep of sending a message over a bus connecting the memory, the input/output adapter and the processor, the message including an address of the memory location and a coherency index for the memory location.

3. A method as in claim 2, wherein in step (b) the coherency index included in the message is used to search the write back cache to determine whether the write back cache contains data for the memory location.

4. A method as in claim 1 wherein in step (a) the block of data contains half as much data as a full cache line in the write back cache.

5. In a computing system which includes a memory, an input/output adapter and a processor, the processor including a cache and the input/output adapter including a translation map, the translation map mapping input/output page numbers to memory address page numbers, each entry in the translation map including an address of a data page in the memory and a DMA type indicator, a method for writing a block of data from the input/output adapter to a memory location within the memory when the block of data contains less data than a full cache line in the cache, the method comprising the steps of:

(a) checking a value of the DMA type indicator for the data page in the memory which contains the memory location;

(b) when the value of the DMA type is equal to a first value, performing the following substeps (b.1) writing the block of data from the input/output adapter to the memory location within the memory, (b.2) searching the cache to determine whether the cache contains data for the memory location written to in substep (b.1), and (b.3) when the search in substep (b.2) determines that the cache contains data for the memory location written to in substep (b.1), purging a full cache line which contains the data for the memory location written to in substep (b.1); and, (c) when the value of the DMA type is equal to a second value, performing the following substeps (c.1) performing a coherent read to obtain from the memory and the cache a cache line which contains the memory location, (c.2) modifying the cache line to include the block of data, and (c.3) writing the cache line modified in substep (c.2) back to the memory.

6. A method as in claim 5, wherein substep (b.1) includes the substep of sending a message over a bus connecting the main memory, the input/output adapter and the processor, the message including an address of the memory location and a coherency index for the memory location.

7. A method as in claim 6, wherein in substep (b.1) the coherency index included in the message is used to search the cache to determine whether the cache contains data for the memory location.

8. A method as in claim 7 wherein the block of data contains half as much data as a full cache line in the cache.

9. In a computing system which includes a memory, an input/output adapter and a processor, the processor including a write back cache in which dirty data may be stored, a method for transferring a full cache line of data, the method, comprising the steps of:

(a) writing a block of data from the input/output adapter to a memory location within the memory, the block of data containing less data than a full cache line in the write back cache;

(b) searching the write back cache to determine whether the write back cache contains data for the memory location written to in step (a);

(c) when the search in step (b) determines that the write back cache contains data for the memory location written to in step (a), purging a full cache line which contains the data for the memory location written to in step (a); and, (d) repeating steps (a) through (c) until the full cache line of data is transferred.

10. A method as in claim 9, wherein step (a) includes the substep of sending a message over a bus connecting the memory, the input/output adapter and the processor, the message including an address of the memory location and a coherency index for the memory location.

11. A method as in claim 10, wherein in step (b) the coherency index included in the message is used to search the write back cache to determine whether the write back cache contains data for the memory location.

12. A method as in claim 9 wherein in step (a) the block of data contains half as much data as a full cache line in the write back cache.

* * * * *